United States Patent [19]

Kromer

[11] Patent Number: 5,007,774
[45] Date of Patent: Apr. 16, 1991

[54] CUTTING OR DRAWING TOOL

[75] Inventor: Roland Kromer, Ettlingen, Fed. Rep. of Germany

[73] Assignee: Maag Gear-Wheel & Machine Company Limited, Zurich, Switzerland

[21] Appl. No.: 581,407

[22] Filed: Sep. 12, 1990

Related U.S. Application Data

[63] Continuation of Ser. No. 261,688, Oct. 24, 1988, abandoned.

[30] Foreign Application Priority Data

Dec. 8, 1987 [CH] Switzerland .................. 04784/87

[51] Int. Cl.[5] .................. B23B 29/24; B23B 27/00
[52] U.S. Cl. .................. 407/94; 407/103; 407/108; 407/73; 407/69
[58] Field of Search .................. 407/31, 35, 30, 37, 407/41, 43, 45, 48, 49, 66, 67, 69, 70, 73, 94, 98, 99, 100, 101, 102, 103, 104, 105, 106, 107, 108, 112

[56] References Cited

U.S. PATENT DOCUMENTS

| 75,060 | 3/1868 | Shaw | 407/102 |
|---|---|---|---|
| 2,289,344 | 7/1942 | Cedarleaf | 407/103 |
| 2,644,224 | 7/1953 | Chilcott | 407/108 |
| 2,645,844 | 7/1953 | Longe | 407/94 |
| 2,690,609 | 10/1954 | Greenberg | 407/94 |
| 2,716,799 | 9/1955 | Bader | 407/67 |
| 3,192,603 | 7/1965 | Greenleaf | 407/103 |
| 3,545,060 | 12/1970 | Kezran | 407/108 |
| 3,885,282 | 5/1975 | Pataky | 407/108 |
| 4,393,735 | 7/1983 | Eckle et al. | 407/99 |

FOREIGN PATENT DOCUMENTS

| 2031832 | 12/1971 | Fed. Rep. of Germany | 407/69 |
|---|---|---|---|
| 2848230 | 5/1980 | Fed. Rep. of Germany | 407/69 |
| 30092 | of 1896 | United Kingdom | 407/69 |

Primary Examiner—Frederick R. Schmidt
Assistant Examiner—Blynn Shideler
Attorney, Agent, or Firm—Bachman & LaPointe

[57] ABSTRACT

A cutting or drawing tool, in which a cutter plate can be precisely located and positioned by means of an adjusting device, in order to produce high-precision profiles. By provision of a second cutter plate, a further face of the workpiece can be machined in a specific relative position to the profile, possibly in a single operation but at least in one setting.

11 Claims, 2 Drawing Sheets

CUTTING OR DRAWING TOOL

This is a continuation of co-pending application Ser. No. 261,688, now abandoned, filed on Oct. 24, 1988.

BACKGROUND OF THE INVENTION

I. The present invention is drawn to a cutting apparatus for producing profiles on a workpiece.

The principle object of the invention is to improve on a cutting or drawing tool of the aforementioned kind, such that at least one cutter plate can be permanently positioned with such precision that high-precision workpieces can be produced, and wherein the cutter plate is easily removed and replaced without the use of special tools. A further object of the invention is to make it possible to machine, in a single setting of the workpiece, profile surfaces and header surfaces between the profile surfaces.

SUMMARY OF THE INVENTION

The foregoing objects are achieved by way of the present invention wherein a cutting apparatus for producing profiles on a workpiece comprises a cutter plate holder having first, second and third bearing surfaces defining a channel, at least one cutter is plate located within the channel and bears on the three bearing surfaces defining the channel. An adjusting device is located in the cutter plate proximate to and in abutting relationship with the at least one cutting plate, the adjusting device is capable of adjusting the position of the cutting plate within the channel. A clamping screw is provided for securely clamping the at least one cutting plate in the channel at its adjusted desired position. The foregoing arrangement allows for production of high precision workpieces. In addition, the arrangements allows the cutter plate to be easily removed and replaced without the need for special tools.

BRIEF DESCRIPTION OF THE DRAWINGS

Further details will be apparent from the description of two examples of embodiments of the invention, with reference to the drawings. In the drawings:

FIG. 1b is a cross-sectional view taken along the line b—b of FIG. 1a;

FIG. 2b is a cross-sectional view of the tool of FIG. 2a.

DETAILED DESCRIPTION

Figure 1A:
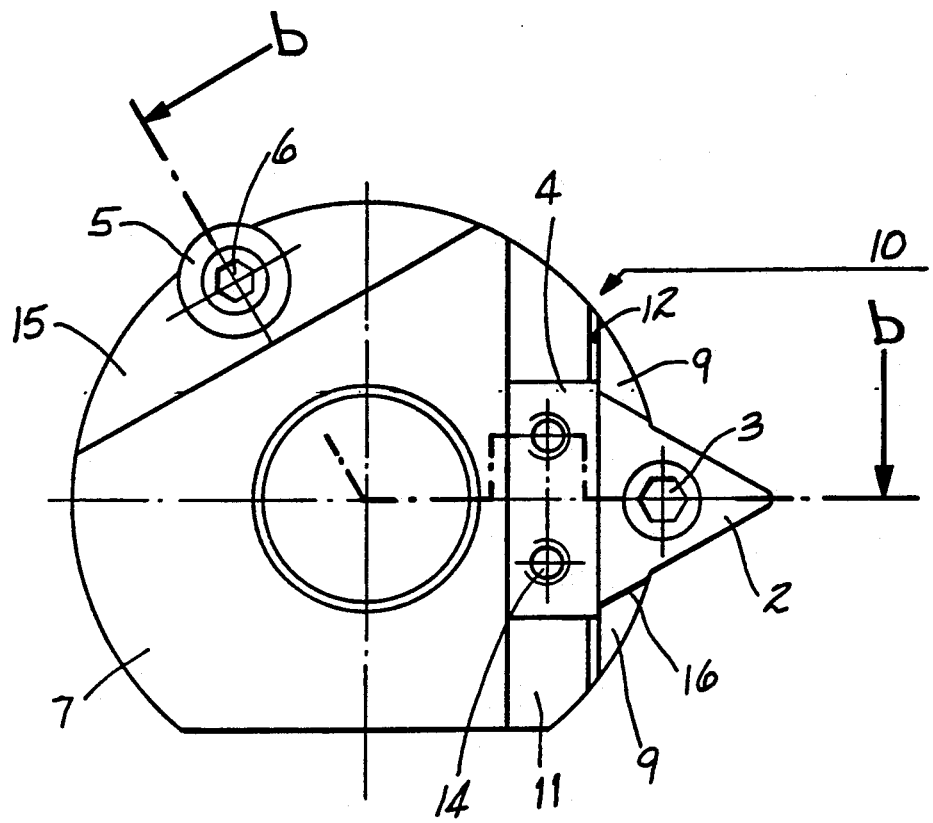
FIG. 1a is a view from below of a first variant of the tool.
Figure 1B:
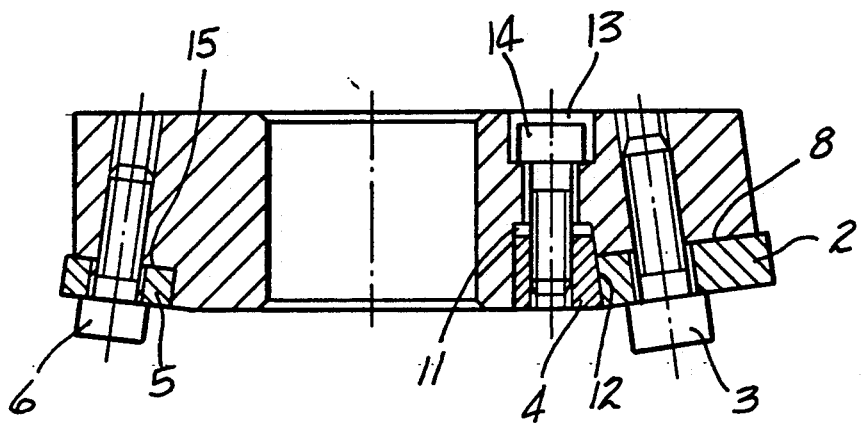
Figure 2A:
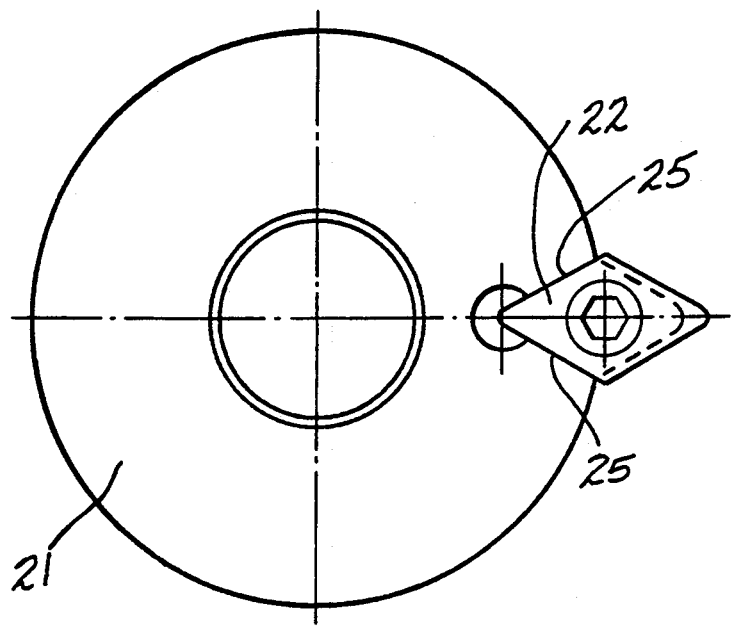
FIG. 2a is a view from below of a second variant of the tool.
Figure 2B:
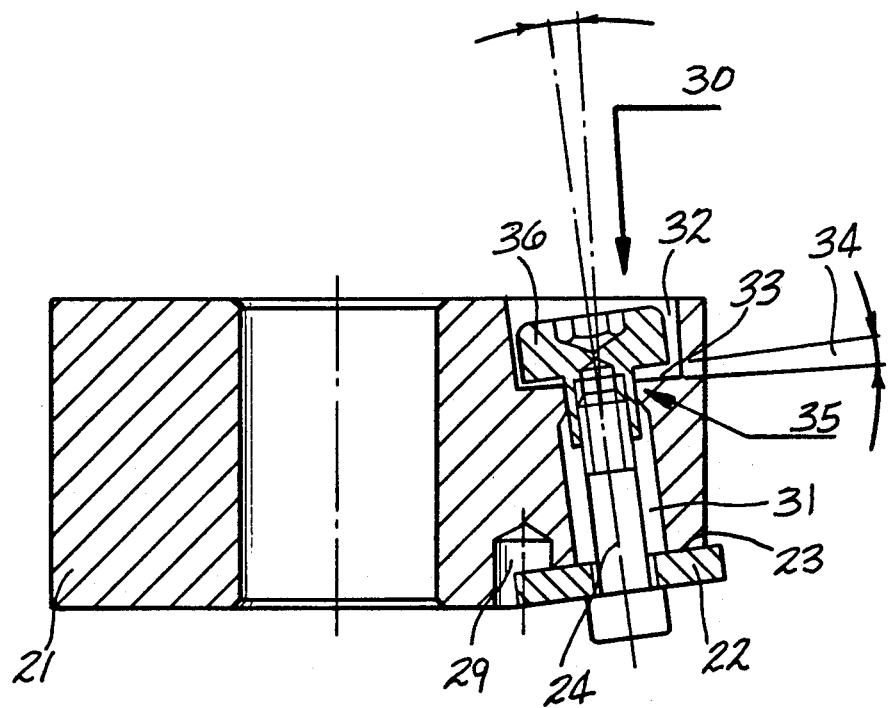

A cutter plate holder 1 is arranged for the mounting of a tool support (not shown) and has, in the region of one of its front faces, a bearing area 8 for a cutter plate 2 of a first design or configuration, which forms an acute angle with one of the front faces. On both sides of this bearing surface 8, arm brackets 9 are formed integrally on the cutter plate holder 1, which have bearing surfaces 16 for bearing on the cutter plate 2. Adjacent to these bearing surfaces 16 and transversely to them is a groove-like recess 11, arranged in the cutter plate holder 1, which groove has a semi-trapezoidal cross-section, the inclined leg of the trapezoid being located in the region of the brackets 9, the inclined leg projecting more deeply into the cutter plate holder 1 than the bearing surface 8, so that a shoulder is formed between the two. This recess 11 is part of an adjusting device 10, which also has an adjusting block 4 seated in this recess 11. The adjusting block acts as a clamping means, and also has a semi-trapezoidal section and a height which is smaller than the depth of recess 11. In the region of recess 11 there is at least one shoulder bore 13 through which an adjusting screw 14 projects and can be screwed into the adjusting block 4. The cutter plate 2 is, in turn, fastened-by means of a clamping screw 3 to the cutter plate holder 1. Located also on the cutter plate holder 1 is a further recess 15 which acts as a bearing surface, the recess being similarly arranged at an acute angle to the front face of the cutter plate holder 1, for a cutter plate 5 of a second design or configuration. The latter is fastened to the cutter plate holder 1 by means of a clamping screw 6. The position of the cutter plate 6 relative to the cutter plate 2 is defined by the position of the surfaces to be machined with each of the two cutter plates.

At the locations dependent on the profile to be produced and its mode of production, there can also be provided several more cutter plates 2 on the cutter plate holder 1.

The cutter plate 2 is first set into the cutter plate holder 1, between the two brackets 9. The cutter plate 2 is fastened temporarily by means of the clamping screw 3. Then, adjusting block 4 is placed into the recess 11 and is brought into the correct working position and fastened by adjusting screw 14. Then, the cutter plate is permanently secured in position with the clamping screw 3. Optionally, the position of the cutting edges of cutter plate 2 are checked by means of measuring instruments relative to at least one reference surface or reference axis of the cutter plate holder 1. The cutter plate 5 of is fastened by means of the clamping screw 6 of on the cutter plate holder 1 and, in accordance with the precision requirements, the position of the cutter is checked by means of measuring instruments relative to at least one reference surface or reference axis or at least relative to at least one edge of the cutter plate 2.

Due to the arrangement of the cutter plate 5 on the cutter plate holder 1, it is possible to machine in a single operation, but at least with a single setting, a further face of the workpiece which is situated in a specific position relative to the profile produced with the cutter plate 2. This saves either an additional operation or an additional setting-up with all the loss of time involved.

A second embodiment of the cutting or drawing tool according to the invention has a cutter plate holder 21, on which is provided on one of its front faces a bearing surface 23 for a cutter plate 22, inclined at an acute angle relative to the adjacent front face. In the region of the internal boundary of the bearing surface 23, a relief bore 29 is provided. In the center region of the bearing surface 23, there is located an adjusting device 30, comprising an adjusting bore 31 extending to the other front face of the cutter plate holder 21, which device has in an adjusting section an adjusting recess 32, the bottom surface 33 of which is inclined at a small acute angle 34 from the axis of adjusting bore 31. In addition, the adjusting bore 31 has in the region of this adjusting recess 32 a constricted section 35 for holding in position a clamping screw 24. Into this there is introduced, from the side of the adjusting recess 32, an adjusting screw 36 with internal threads, and into this is screwed the clamping screw 24, which is passed through the cutter plate 22 and the adjusting bore 31, and which clamps the cutter plate 22 tightly on the bearing surface 23.

Positioning surfaces 25 are located laterally adjacent to the bearing surface 23, and protrude over the bearing surface 23. The positioning surfaces 25 correspond to the form of the cutter plate in this region. More particularly, the adjusting screw 36 and the clamping screw 24 are finely threaded.

By means of the clamping screw 24, which is screwed into the adjusting screw 36 as a counter screw, the cutter plate 22 is pressed on the bearing surface 23 and is slightly canted due to the acute angle 34 between the shoulder of the adjusting screw and the bottom surface 33 of the adjusting recess 32, so that, according to the screwing force, a resulting force will be exerted on the cutter plate 22 in the direction of the positioning surfaces 25. This resulting force effects a pressing against the positioning surfaces 25 and thereby an exact positioning of the cutter plate.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A cutting apparatus for producing profiles on a workpiece comprising:
   a cutter plate holder having first, second and third bearing surfaces defining a channel;
   at least one cutter plate located within said channel and bearing on said first, second and third bearing surfaces;
   positioning means located within said cutter plate holder in abutting relationship with said at least one cutter plate for positioning the position of said at least one cutter plate within said channel against said second and third bearing surfaces; and
   clamping means for securely clamping said at least one cutter plate in said channel against said first bearing surface at said position.

2. A cutting apparatus according to claim 1 wherein the at least one cutter plate rests on said first bearing surface of the cutter plate holder and said clamping means extends transversely thereto wherein a recess is provided adjacent to said first bearing surface in said cutter plate holder for receiving said positioning means and said second and third bearing surface extend transversely to said first bearing surface.

3. A cutting apparatus according to claim 2, wherein the second and third bearing surfaces form an angle relative to each other, to act as bearing surfaces for said at least one cutter plate.

4. A cutting apparatus according to claim 3 wherein the first bearing surface for the cutter plate means is inclined at an angle with respect to the front surfaces of the cutter plate holder.

5. A cutting apparatus according to claim 2 wherein the positioning means comprises an positioning block seated in said recess and is retractable to varying depths by means of at least one adjusting screw supported in the cutter plate holder.

6. A cutting apparatus according to claim 5 wherein said at least one cutter plate is provided with an angled wedged face which bears on said positioning block for positioning the cutter plate within the channel.

7. A cutting apparatus according to claim 6 wherein the cutter plate has a substantially triangular form wherein one side of the triangle bears against the positioning means and another side of the triangle has at least one cutting edge.

8. A cutting apparatus according to claim 2 wherein the cutter plate holder has a bearing surface for supporting the cutter plate as well as a bore for accommodating a clamping means extending perpendicularly through the cutter plate to the bearing surface.

9. A cutting apparatus according to claim 8 wherein the positioning means comprises a screw passing through a bore on the cutter plate holder.

10. A cutting apparatus according to claim 1 wherein a second cutter plate is clamped in the cutter plate holder.

11. A cutting apparatus according to claim 10 wherein the second cutter plate has a substantially round shape and is received in a recess provided in the cutter plate holder which is inclined relative to the front surface of the cutter plate holder.

* * * * *